United States Patent [19]
Hayakawa et al.

[11] 4,153,231
[45] May 8, 1979

[54] MOULD ASSEMBLY FOR FOAM MOULDING OF PLASTIC MATERIALS

[75] Inventors: Akifumi Hayakawa, Tokyo; Akira Aiba, Kawasaki; Eiki Orihara, Tokyo; Kiyoshi Fukushima, Fujisawa, all of Japan

[73] Assignee: Nippon Steel Chemical Co., Ltd., Tokyo, Japan

[21] Appl. No.: 848,321

[22] Filed: Nov. 3, 1977

[30] Foreign Application Priority Data

Nov. 8, 1976 [JP] Japan .................................. 51/133269
Nov. 8, 1976 [JP] Japan .................................. 51/133270

[51] Int. Cl.$^2$ ............................................. B29D 27/00
[52] U.S. Cl. ....................................... 249/82; 249/141; 425/546; 425/817 R
[58] Field of Search .................... 425/4 R, 817 R, 812, 425/546; 164/305, 410; 249/141, 82; 264/51, 52, 41

[56] References Cited

U.S. PATENT DOCUMENTS 3,329,198  7/1967  Manning et al. ................. 425/812 X

FOREIGN PATENT DOCUMENTS 27271  10/1972  Japan ......................................... 425/4 R

*Primary Examiner*—Roy Lake
*Assistant Examiner*—Mark Rosenbaum
*Attorney, Agent, or Firm*—Fleit & Jacobson

[57] ABSTRACT

Mould assembly for foam moulding of plastic materials, which comprises stationary and movable dies and an auxiliary die plate device between the stationary and movable dies. A gas passage is formed for introducing pressurized inert gas into the mould cavity. The auxiliary die device comprises separated inner and outer auxiliary dies both being spring biased toward the stationary die. O-ring seals are disposed between the opposite surfaces of the outer auxiliary die and the stationary and movable dies.

5 Claims, 4 Drawing Figures

MOULD ASSEMBLY FOR FOAM MOULDING OF PLASTIC MATERIALS

The present invention relates to mould assemblies for injection moulding of foamable plastic material and more particularly to mould assemblies for producing moulded articles of foamed plastic materials which are free of swirl patterns or similar melt flow lines.

Where a foamable plastic material is used for injection moulding of an article, the materials are allowed to expand as soon as they are injected in molten form into the moulds. During such expansion of the molten plastic material, swirls of gas are produced in the mold cavities and cause socalled swirl patterns on the product surfaces. Such patterns are similar to patterns of wood grains and may sometimes be useful for decoration purposes, however, they are undesirable in many cases.

In order to perform foam moulding processes without producing any undesirable surface patterns, it has been proposed to charge the mould cavity with a pressurized inert gas which is gradually relieved as the molten plastic material is injected so that the mould cavity is filled with the molten plastic while foaming of the material is being suppressed. After a short period of time wherein the plastic material is partially solidified to form a thin film along the wall surface of the mould cavity, the inert gas pressure is completely relieved and where necessary the mould cavity is expanded to allow the plastic material therein to foam. Examples of such foam injection moulding are disclosed in the U.S. Pat. No. 3,268,635 issued to R. A. Kraus et al. on Aug. 23, 1966 and in the Modern Plastics, March 1969 issue by C. L. Weir in his article entitled "New Foam Molding Process Offers New Product Versatility".

In the Plastics World, June 1970 issue, there is disclosed an expansible mould assembly for use with the aforementioned foam injection moulding. The mould assembly comprises stationary and movable dies and a third plate which is located between the stationary and movable dies and spring-biased in such a manner that even when the movable die is moved with respect to the stationary die for expanding the mould cavity the third plate is maintained in engagement with the stationary die. Annular sealing members are disposed between the stationary die and the third plate and also between the movable die and the third plate so that the mould cavity is sealed against leakage of the gas pressure when the mould assembly is fully closed.

In this type of mould assembly, it has been a usual practice to provide the third plate with gas passage means through which the pressurized inert gas is introduced into the mould cavity. The gas passage is provided with a valve which is adapted to alternately connect the mould cavity with the pressurized gas source and through a relief valve and/or a shut-off valve with the atmosphere. One of the dies, for example, the stationary die is provided with a sprue which is adapted to be connected with an injection nozzle for injecting molten plastic material.

It has been found, however, that the products manufactured through the aforementioned process with the aforementioned mould assembly are defective in that they may often have over-expanded areas in those zones adjacent to the third plate. Further, undercuts may also be produced in the product surfaces which are in the vicinity of the sprues. The above over-expansion is understood as being caused by the fact that, when the movable die is displaced with respect to the stationary die to expand the mould cavity, the biasing force on the third plate is correspondingly decreased so that the third plate is slightly moved in the direction of the movement of the movable die under the restoring force of the sealing member. The pressure of the residual gas in the mould cavity may also have some influence on such movement of the third plate. The undercuts are considered as being caused by residual gas. When the molten plastic material is injected into the mould cavity through the sprue, it at first impinges the opposing cavity surface and is splashed in the mould cavity. This may cause turbulence of the pre-charged gas and a part of such gas may remain in the cavity even after the gas pressure is relieved possibly causing the aforementioned undercuts.

The present invention has therefore an object to provide mould assemblies for foam injection moulding which do not have the aforementioned disadvantages of the conventional moulds.

Another object of the present invention is to provide mould assemblies for foam injection moulding which have means for preventing over-expansions in the moulded parts.

A further object of the present invention is to provide mould assemblies having means for relieving residual gas.

According to the present invention, the above and other objects can be accomplished by a mould assembly for foam moulding which comprises a stationary die, a movable die co-operating with said stationary die to form a mould cavity therebetween, auxiliary die means disposed between said stationary and movable dies and having surface means exposed to said mould cavity, means for biasing said auxiliary die means toward one of said stationary and movable dies, means for introducing pressurized gas into said mould cavity, and seal means disposed between said auxiliary die means and said stationary and movable dies, characterized by the fact that said auxiliary die means includes a first auxiliary die having said surface means exposed to said mould cavity and a second auxiliary die located radially outside the first auxiliary die, said first and second auxiliary dies being independently biased by said biasing means, said seal means being disposed between said second auxiliary die and said stationary and movable dies.

According to the present invention, the first auxiliary die is free from the influence of the seal means so that it can be maintained in contact with said one of the stationary and movable dies even when the movable die is displaced for effecting expansion of the moulding cavity. According to a preferable aspect of the present invention, means is provided in at least one of the stationary and movable dies for removing gas remaining in the mould cavity in order to avoid occurrence of undercuts in the product surfaces. Such gas removing means may be provided around a sprue formed in the corresponding die and may be in the form of fine aperture means which may be formed by means of porous material such as a sintered metal. Such aperture means may also be provided by holes in which pins are received with small gaps.

The above and other objects and features of the present invention will become apparent from the following descriptions of preferred embodiments taking reference to the accompanying drawings, in which.

Figure 1:
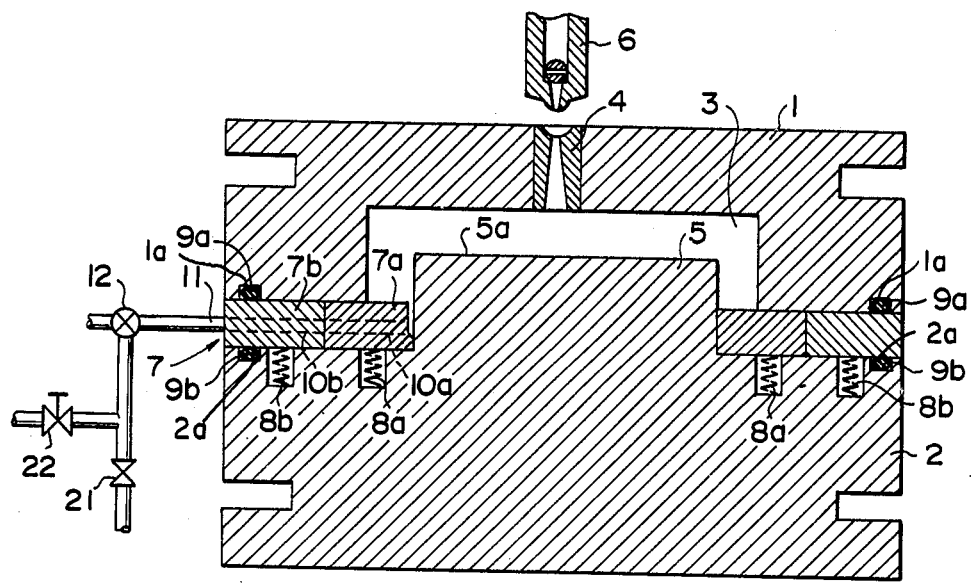
FIG. 1 is a sectional view of the mould assembly for foam moulding in accordance with one embodiment of the present invention.
Figure 2:
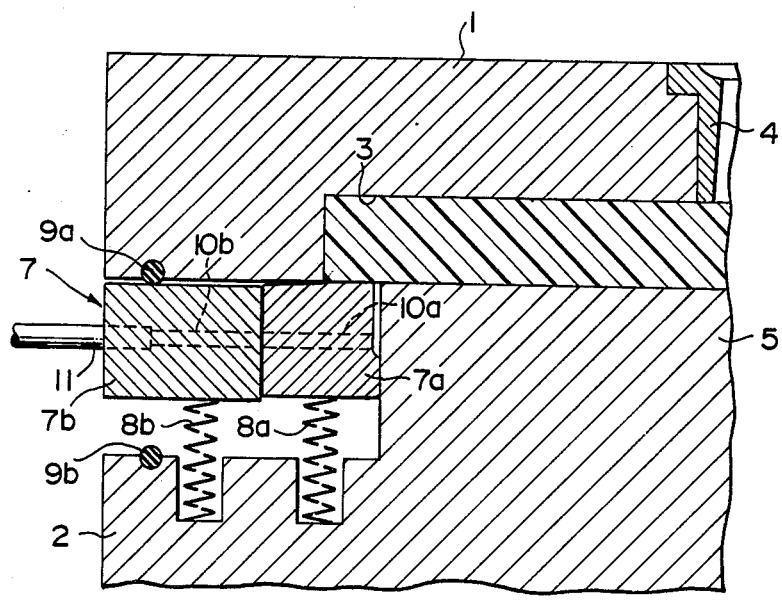
FIG. 2 is a fragmentary sectional view of the mould assembly showing the movable die in the displaced position.

Referring now to the drawings, particularly to FIGS. 1 and 2, the mould assembly shown therein includes a stationary die 1 and a movable die 2 which are co-operating with each other to define a mould cavity 3 therebetween. A suitable clamping mechanism (not shown) may be provided to maintain the mould dies 1 and 2 at desired relative positions. The stationary die 1 includes a sprue 4 which is provided through the die 1 and opening to the cavity 3. The movable die 2 has a projection 5 which extends into the mould cavity 3 when the mould assembly is in fully closed position. The sprue 4 is adapted to receive an injection nozzle 6 for injecting molten plastic material.

Between the dies 1 and 2, there is provided an auxiliary die assembly 7 which includes an inner auxiliary die 7a and an outer auxiliary die 7b. The auxiliary dies 7a and 7b are resiliently biased by means of springs 8a and 8b, respectively, toward the stationary die 1. The stationary die 1 and the movable die 2 are formed with seal grooves 1a and 2a, respectively, to receive O-ring seals 9a and 9b for sealing engagement with the opposite sides of the outer auxiliary die 7b.

The inner and outer auxiliary dies 7a and 7b have radially extending aligned gas passages 10a and 10b. The gas passage 10a opens to the radially inner surface of the die 7a and the gas passage 10b is connected with a conduit 11 which has a valve 12 for alternately connecting the passage 10b either to a source of pressurized nitrogen gas or through a shutoff valve 21 or a relief valve 22 to the atmosphere.

As well known in the art, the movable die 2 is movable between a first or fully closed position wherein the projection 5 thereon extends into the mould cavity 3 as shown in FIG. 1 and a second or expanded position wherein the end surface 5a of the projection 5 is flush with the adjacent surface of the inner auxiliary die 7a as shown in FIG. 2. In moulding operation, the movable die 2 is placed at the first position and the mould cavity 3 is at first charged with pressurized nitrogen gas which is introduced into the cavity 3 through the conduit 11 and the gas passages 10a and 10b. In this position of the mould assembly, the cavity 3 is gas-tightly sealed by the O-rings 9a and 9b. The valve 12 is then actuated to connected the passage 10b with the relief valve 22 and with the shut-off valve 21 which is in this instance closed. Then, the molten plastic material is introduced through the injection nozzle 6 and the sprue 4 into the cavity 3. As the cavity 3 is filled with molten plastic material, the nitrogen gas is gradually released from the cavity 3 through the relief valve 22 which maintains the pressure in the cavity at a predetermined value. Since the molten plastic material is subjected to the gas pressure, foaming is suppressed and the material is charged in the cavity 3 without being foamed. The die 2 is maintained in the position shown in FIG. 1 until a thin film is formed along the wall surface of the cavity 3.

Thereafter, the injection of the plastic material is terminated and the shut-off valve 21 is opened to release the gas pressure in the cavity 3. Then, the movable die 2 is displaced to the second or expanded position as shown in FIG. 2. Thus, the material in the cavity 3 is allowed to foam. Since the biasing force of the springs 8a and 8b is decreased as soon as the die 2 is moved to the second position, the O-ring 9a between the stationary die 1 and the outer auxiliary die 7b is allowed to restore its shape overcoming the biasing force of the spring 8b. As the result, the outer auxiliary die 7b is slightly displaced against the function of the spring 8b producing a small gas as shown in FIG. 2 between the stationary die 1 and the outer auxiliary die 7b. According to the present invention, however, since the inner auxiliary die 7a is formed separately from the outer die 7b, the inner die 7a is free from the influence of the O-ring 9a. Thus, the inner die 7a is maintained in engagement with the stationary die 1 under the action of the spring 8a.

Figure 4:
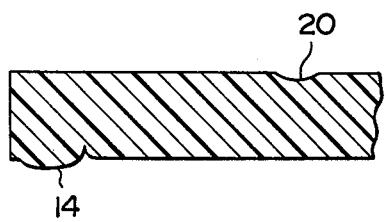
FIG. 4 is a fragmentary sectional view of a foam moulded product showing a typical defect which may be produced by conventional moulds.

In conventional mould assemblies, the auxiliary die assembly has been provided as an integral part so that the part corresponding to the inner die 7a of the above arrangement has been displaced under the influence of the O-ring seal as the latter has restored its shape. Thus, the products as produced by such conventional moulds often had a bulged or over-expanded area as shown by 14 in FIG. 4. The aforementioned arrangement of the present invention is effective to prevent such defects in the moulded products because the inner auxiliary die 7a remains in engagement with the stationary die 1 even when the movable die 2 is displaced to the second position.

Figure 3:
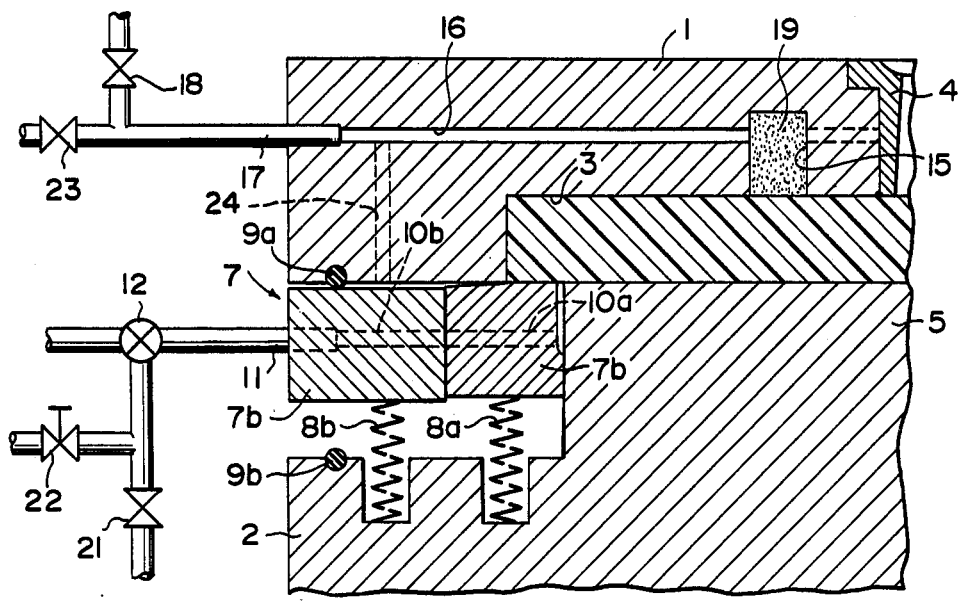
FIG. 3 is a fragmentary sectional view similar to FIG. 2 but showing another embodiment of the present invention.

FIG. 3 shows another embodiment of the present invention in which the mould assembly has the same general construction as the foregoing embodiment, so that corresponding parts are shown by the same reference numerals. In this embodiment, the stationary die 1 has formed around the sprue 4 an appropriate number of holes 15 which on one hand open to the cavity 3 and on the other hand connect with a gas passage 16 formed in the die 1. The gas passage 16 is connected in turn with a conduit 17 which has a relief valve 18 and a shut-off valve 23. Alternatively, the passage 16 may be connected with the passage 10b by a passage 24. The holes 15 are filled with plugs 19 of porous material such as a sintered metal. Alternatively, the holes may be plugged by pins with small gaps between the walls of the holes and the pins so as to allow gas in the cavity 3 to pass into the passage 16. The holes 15 may be substituted by one or more annular or arcuate recesses which may be located around the sprue 4.

According to the arrangement of this embodiment, any residual gas in the vicinity of the sprue 4 can be removed through the holes 15, the passage 16 and the conduit 17 as soon as the valve 23 is opened. This is effective to prevent formation of defective undercuts or recesses on moulded products such as those shown by 20 in FIG. 4.

The invention has thus been shown and described with reference to specific embodiments, however, it should be noted that the invention is in no way limited to the details of the illustrated structures but changes and modifications may be made without departing from the scope of the appended claims. For example, in the aforementioned embodiments, it has been described that the female die 1 is stationary and the male die 2 is movable. However, it is of course possible to make the female die movable and the male die stationary.

We claim:

1. Mould assembly for foam moulding which comprises a stationary die, a movable die co-operating with said stationary die to form a mould cavity therebetween and movable to change the volume of said mould cavity, auxiliary die means disposed between said stationary and movable dies and having surface means exposed to said mould cavity, means operatively associated with one of said stationary and movable dies for biasing said auxiliary die means toward the other of said stationary and movable dies, means for introducing pressurized gas into said mould cavity, means for drawing gas from said mould cavity, and seal means disposed between said auxiliary die means and said stationary and movable dies, said auxiliary die means including a first auxiliary die having said surface means exposed to said mould cavity and a second auxiliary die located radially outside the first auxiliary die, said first and second auxiliary dies being independently biased by said biasing means, said seal means being disposed between said second auxiliary die and said stationary and movable dies.

2. Mould assembly in accordance with claim 1 in which said biasing means is adapted to bias the auxiliary die means toward the stationary die.

3. Mould assembly in accordance with claim 1 in which at least one of the stationary and movable dies includes sprue means for injecting molten plastic material into the mould cavity, and means for removing residual gas remaining in the mould cavity.

4. Mould assembly in accordance with claim 3 in which said residual gas removing means includes recess means formed in said at least one die and opening to the mould cavity, said recess means being in communication through valve means with the atmosphere and filled by porous material.

5. Mould assembly in accordance with claim 4 in which said porous material is a sintered metal.

* * * * *